April 14, 1925.
J. R. JOHNSON
1,533,703
DRUM TYPE MILLING MACHINE
Filed Oct. 17, 1921
4 Sheets-Sheet 4
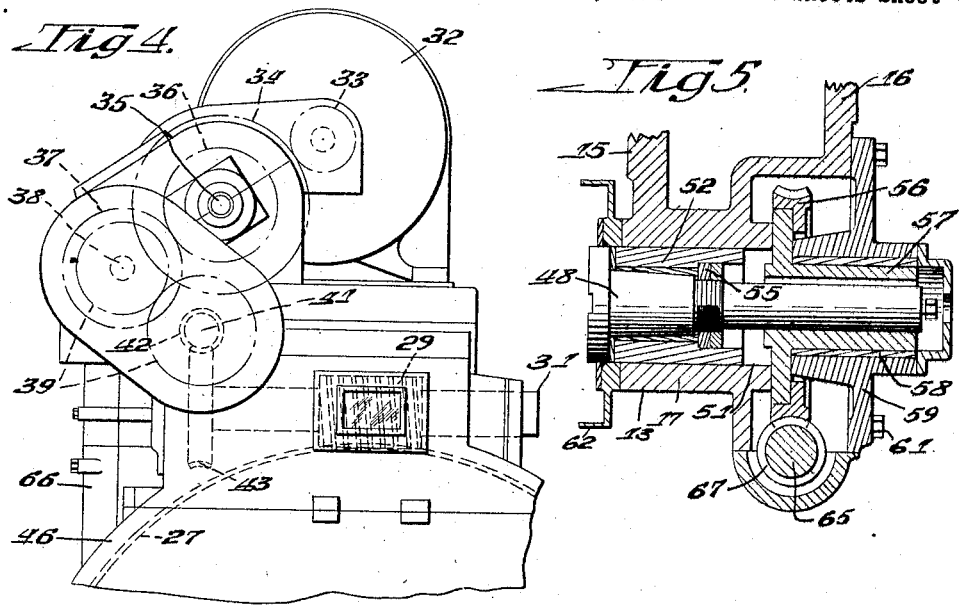
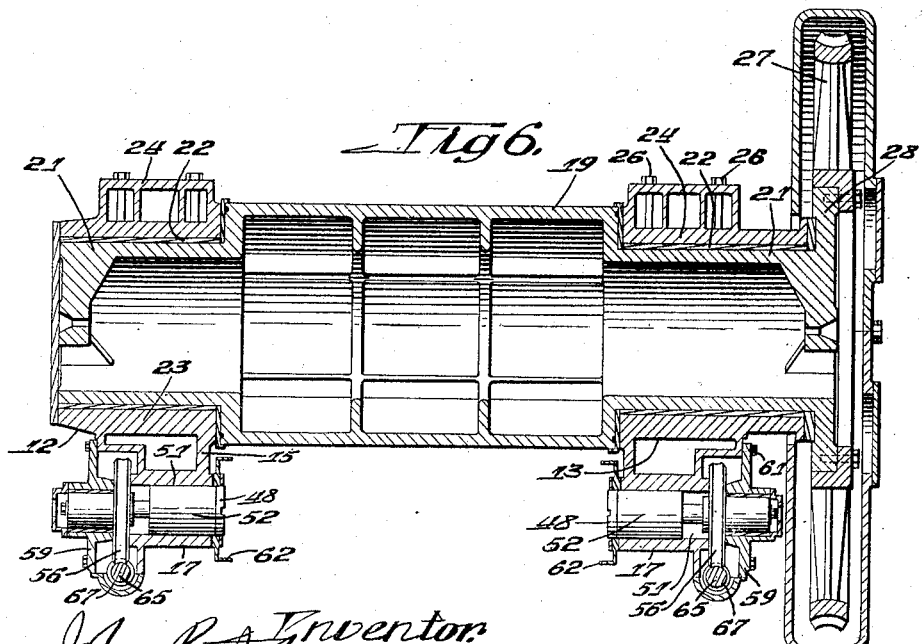

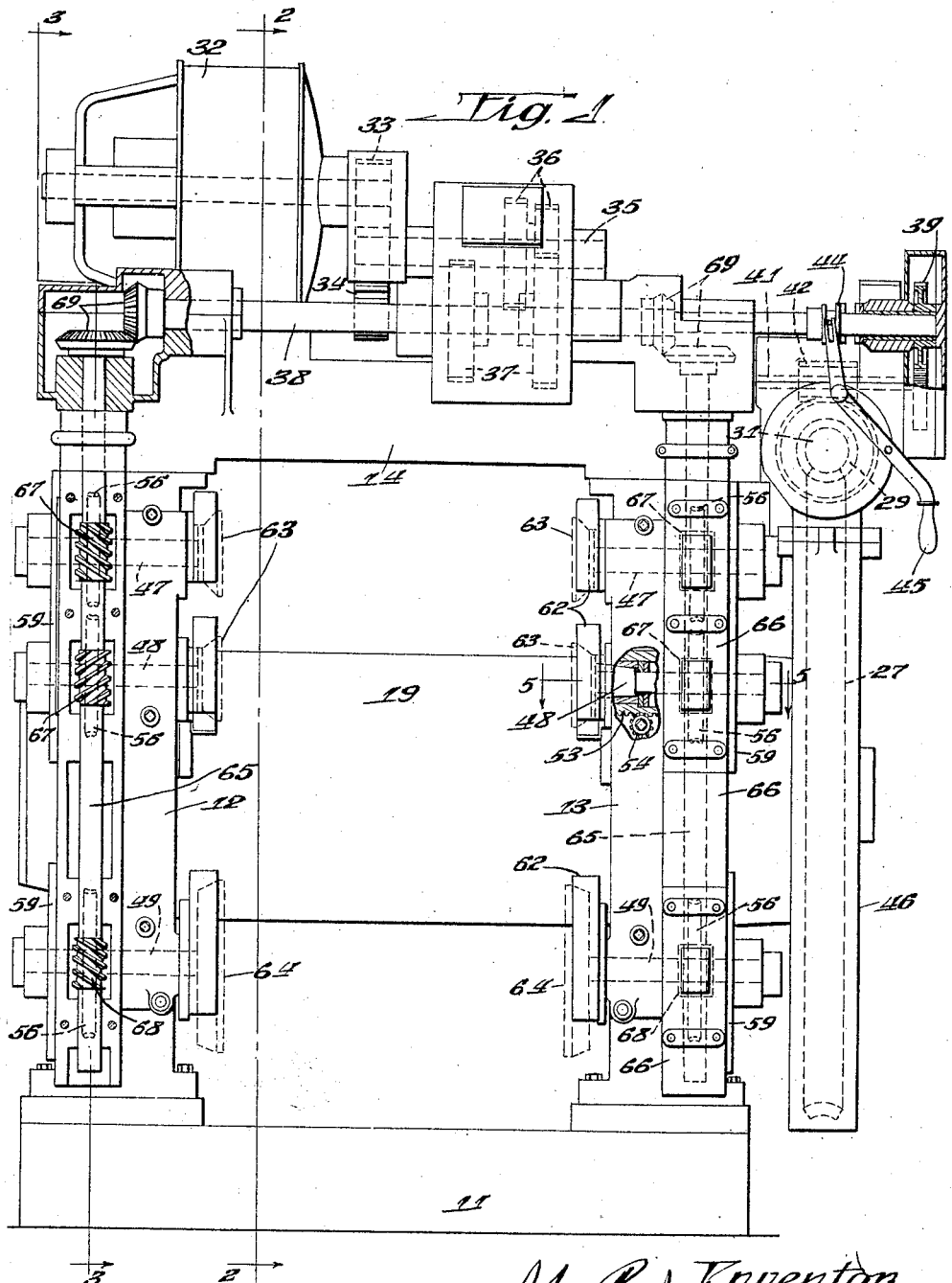

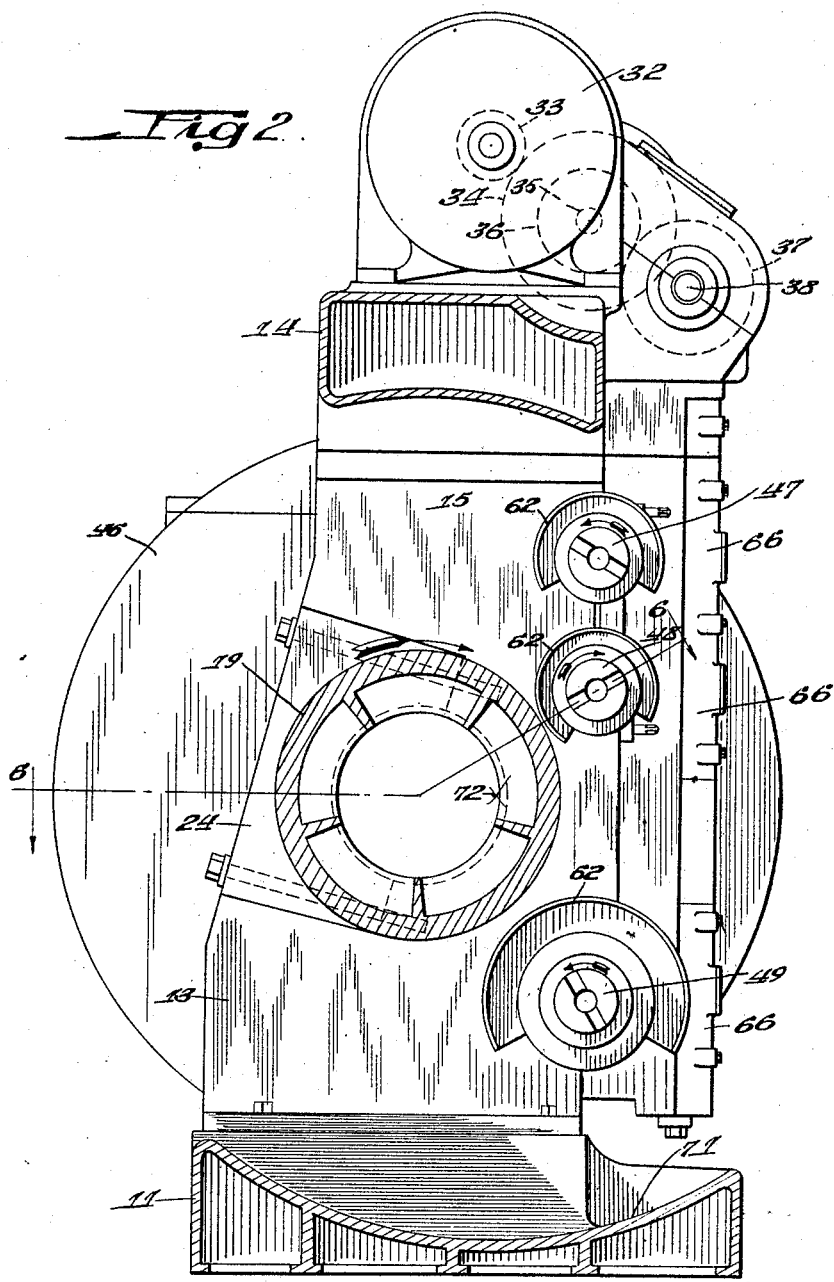

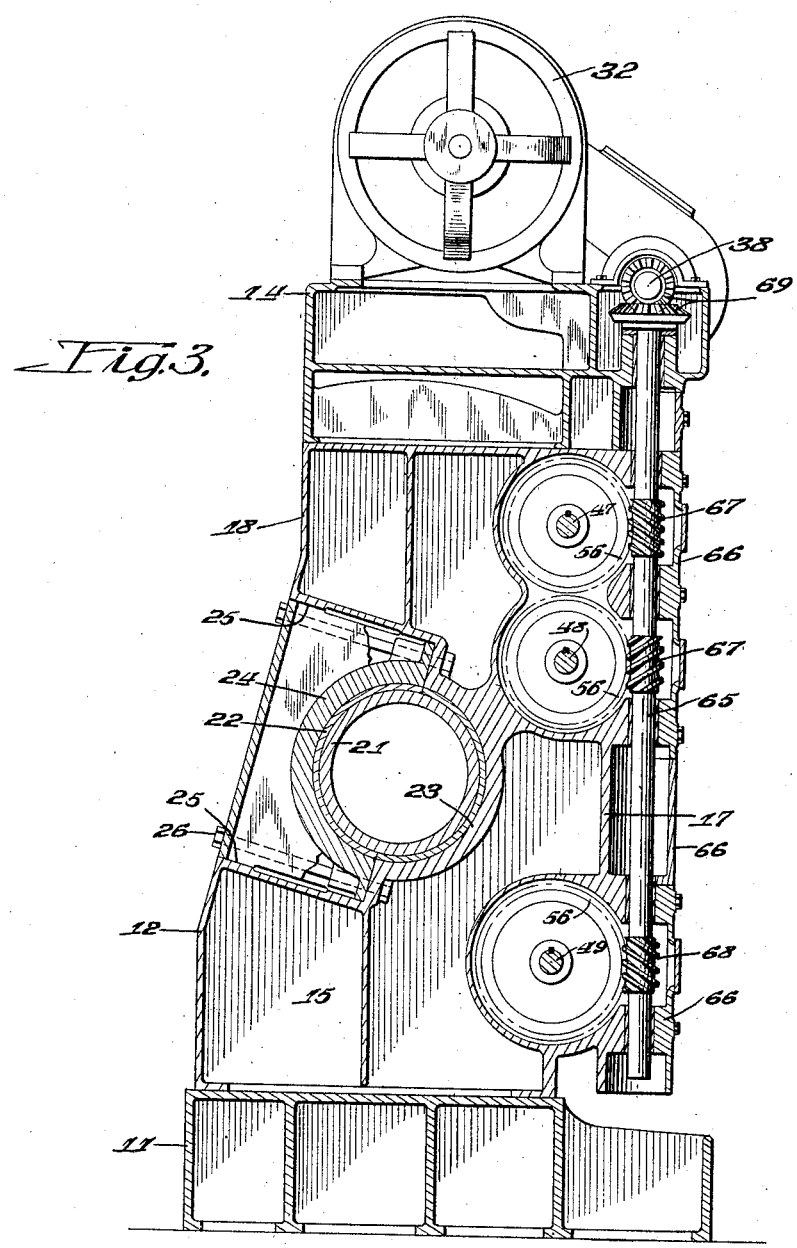

Patented Apr. 14, 1925.

1,533,703

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

DRUM-TYPE MILLING MACHINE.

Application filed October 17, 1921. Serial No. 508,340.

*To all whom it may concern:*

Be it known that I, JOHN R. JOHNSON, a citizen of the United States, residing at Rockford, in the county of Winnebago and State of Illinois, have invented certain new and useful Improvements in Drum-Type Milling Machines, of which the following is a specification.

This invention relating in general to metal-surfacing machines, has more particular reference to drum type milling machines such as disclosed in my United States Letters Patent No. 1,414,812 and characterized by a base occupying relatively small floor space and having upright side housings which support a rotary work-carrying drum and cutter spindles so arranged that the work-pieces will be carried in succession between the cutters by rotation of the drum.

The primary object of the present invention is to generally simplify and improve the design and construction of milling or surfacing machines of this type, with the view to obtaining greater efficiency in operation and economy in producing accurate work rapidly and in large quantities, and to reducing the cost of manufacture of these machines.

In furtherance of the foregoing, my invention contemplates generally stated, the provision of a novel work-carrying drum and driving mechanism therefor of an improved character; cutter spindles built into the side housings, thereby insuring greater rigidity and permitting of more efficient design and operation of multiple-spindle special purpose machines; a novel arrangement of the spindle parts and driving mechanism; improvements in the base and housing construction; and other features explained more fully hereinafter.

Other objects and attendant advantages will be appreciated by those skilled in this art as the invention becomes better understood by reference to the following description when considered in connection with the accompanying drawings, in which—

Figure 1 is a front elevation of a drum type milling machine, partly in section, embodying my invention;

Fig. 2, a vertical section taken substantially on the line 2—2 of Fig. 1, showing the motor merely in outline;

Fig. 3, a similar section taken substantially on the line 3—3 of Fig. 1;

Fig. 4, a fragmentary side elevation looking at the right hand side of Fig. 1;

Fig. 5, an enlarged horizontal section typical of the spindle construction mounting as taken substantially on the line 5—5 of Fig. 1; and Fig. 6, a dual plane section taken substantially on the line 6—6 of Fig. 2.

Referring now more particularly to the drawings, it will be observed that the frame of the machine is composed of a base 11, laterally spaced upright side housings 12 and 13 rigidly mounted on the base, and a top plate structure 14 mounted upon and rigidly joining the upper ends of the side housings. These frame parts or units are each in the form of a heavy casting and, when fixedly bolted or otherwise connected together, present a substantially unitary, sturdy frame structure possessing great rigidity. It will be noted that the side housings are of a hollow column type, each comprising inner and outer side walls 15 and 16 and front and rear walls 17 and 18 respectively. These side housings are utilized for supporting a rotary work-carrying drum and cutter spindles in a novel and particularly advantageous relation as will presently be described.

The work-carrying drum consists in the present instance of a relatively large diameter cylindrical body or drum 19 having reduced cylindrical ends or trunnions 21 journaled in suitable bearings 22 in the side housings. The drum body and its trunnion ends may be in the form of an integral casting as shown, reinforced interiorly by suitable ribs. Each trunnion bearing block as shown in Fig. 3, comprises a stationary part 23 fixed with respect to its side housing and a removable part or bearing cap 24 which has upper and lower sustaining walls 25 fitting against contiguous walls of its housing, the bearing caps being removably secured in position on the housing by bolts 26. The drum body 19 interposed between the side housings is adapted to have clamped peripherally thereabout, or otherwise associated therewith, a work-carrying fixture of any suitable or preferred construction. Inasmuch as the work fixture per se forms no part of the present invention, no example of one has been shown in the drawings, but in the use of the invention it will be understood that a suitable fixture will be provided for carrying the workpieces in circumferentially spaced relation on the drum, either at one or both ends thereof, or reaching from end to end thereof, depending on the size and shape of the work-pieces. It will be noticed at this point, however, that the present construction enables removal of the drum as an entirety so that it may be replaced by another equipped with a different work fixture. This is desirable inasmuch as in some instances it is easier, quicker and more practical to change the drum and its work fixture as a unit than to remove the work fixture from the drum and mount another fixture. This invention, however, comprehends the drum as a work-carrying agent irrespective of the method of fastening the work-pieces thereto. It will be noticed that the drum has large and substantial bearings in the side housings only, and that no supplemental bearings are required.

Mechanism is provided for revolving the drum as in a clockwise direction viewing Fig. 2, so that the work-pieces will be carried in succession between cutters carried by the side housings and preferably located close to or accessible from the front of the machine. As the drum revolves the work-pieces after having left the cutters, will be carried upwardly at the rear of the machine which I term the loading and unloading station. The immediate means for driving the drum is a worm wheel or gear 27 of comparatively large diameter fixed to an annular flange 28 at the outer end of and integral with one of the trunnion ends 21 as shown in Fig. 6. The worm wheel is driven by a worn 29 fixed to a shaft 31 positioned above the worm wheel.

Mechanism mounted on the top plate structure 14 and employed for driving the worm shaft 31 may be of any suitable or preferred construction. In the present case, it comprises an electric motor 32 and a driving train between the motor and worm shaft 31 including reduction gearing and a clutch. This driving train comprises a spur pinion 33 on the motor shaft meshing with a spur gear 34 fixed to an intermediate shaft 35 on which is axially slidable a pair of connected gears 36 of different diameter adapted to be engaged with either of the gears 37 fixed to the shaft 38 which is journaled on the top plate structure. By driving either one or the other of gears 37 the shaft 38 will be driven at different speeds. Said shaft 38 is connected to the worn shaft 31 through a pair of pick-off or change-speed gears 39 one of which is fixed to a shaft 41 carrying a worm 42 meshing with a worm gear 43 fixed to the shaft 31. By means of a suitable clutch 44 between the shaft 38 and the gear 39 thereon, the driving connection between the motor and work drum may be established or disconnected at will. The clutch may be shifted by any suitable means and at present a hand lever 45 is provided. The driving train just described is suitably enclosed by casings including the casing 46 which completely houses the worm wheel 27. From the foregoing, it will be observed that the drum is driven from one end only and by a worm wheel of relatively large diameter so that a powerful leverage is obtained. By utilizing a single large worm wheel the driving mechanism is obviously simplified. Another important advantage of the large diameter driving wheel is that it eliminates vibration of the work and promotes smooth cutting.

It will now be noted that my invention contemplates locating and building the cutter spindles in the side housings. This not only greatly simplifies the mounting of the spindles and their driving mechanism but also insures greater rigidty of the cutters. Furthermore, this eliminates the usual saddle construction by reason of the fact that the side housings themselves form the immediate casing and support for the spindles. The construction is also especially adapted for an oiling system embodying gravity feed down through the housings, as claimed in my companion application Serial No. 508,341. In connection with arranging the spindles in the housings my invention also contemplates a novel unit assembly construction, which will be presently described.

It should be borne in mind, however, that my invention comprehends the positioning of one or more spindles on either or both housings in any desired location thereon and preferably adjacent to the front side of the machine so as to be accessible and in view from this side and remote from the loading and unloading side of the machine. In the present example, I have mounted three spindles on each side housing spaced one above the other in a vertical plane so that they may be driven from a common driving shaft. The two uppermost spindles 47 and 48 on each housing are grouped together above the horizontal plane of the drum axis and are adapted for carrying roughing cutters. The lower spindle 49 on each housing is positioned below said axis and adapted for carrying a finishing cutter. The mounting and construction of each spindle and its immediate driving means is substantially identical, hence a detail description of one will suffice. Fig. 5 is typical of the spindle construction. From this it will be seen that the side housing 13 is shaped to provide a cylindrical bearing 51 in which is axially slidable a spindle bearing sleeve or quill 52 which has a rack face 53 shown in Fig. 1, engaged by a spur pinion 54 adapted to be rotated from the front of the machine for feeding the spindle lengthwise. The spindle has the usual taper bearing in the sleeve 52. The spindle and its sleeve together with the usual lock nuts 55 constitute a unit assembly adapted to be placed in position from either the inner or the outer side of the housing. Another unit assembly adapted to be placed in position from the outer side of the housing comprises a worm gear 56 fixed to a hub 57 splined on the spindle and revoluble on a bearing 58 carried by the end plate 59. This end plate structure is so shaped that when secured in position on the housing by the bolts 61 it will hold the gear 56 in position against outward displacement, the gear in the present instance being held against inward displacement by engagement with the housing structure. A suitable cutter guard 62 is provided. Each spindle is adapted for carrying a surface milling cutter preferably of the inserted tooth type, as is well understood in this art, the roughing and finishing cutters 63 and 64 respectively being indicated in dotted lines in Fig. 1. The finishing cutter may, however, be a grinding wheel driven at the proper speed. In a machine of the type disclosed herein, grinding wheels may be used exclusively or in combination with milling cutters. In other words, any rotary tool for surfacing the work may be employed. The spindles in each housing are driven by a vertical shaft 65 which I have positioned at the front side of the machine and so mounted on its respective housing as to be readily accessible by removal of the cover plates 66. Viewing Fig. 3, it will be seen that each shaft 65 suitably journaled at spaced intervals carries right and left hand worms 67 in mesh with the worm gears for the upper spindles and a worm 68 in mesh with the worm gear for the lower spindle. Each spindle driving shaft 65 is connected at its upper end to the driving shaft 38 through the agency of beveled gears 69. It follows therefore, that when the shaft 38 is driven the spindles will be constantly revolved in the directions shown by the arrows in Fig. 2, it being observed that the roughing cutters are revolved in opposite directions. The shafts 65 are each shown at present as being in a single piece, whereas in practice, each is of sectional construction, comprising a plurality of worm shafts joined by couplings to facilitate manufacture. It will be noted that the construction and arrangement of the spindles and their driving mechanism in the housings lends itself particularly advantageous to the use of a gravity feed or cascade system of oiling which as mentioned above forms the subject matter of a companion application.

Attention is now directed to the base which has a sunken top 71 best shown in Fig. 2, disposed between and extending from one side housing to the other and providing clearance for the work so that the drum may be positioned as low as possible. This sunken top also provides a drain and chip trough and is shaped so that the bottom slopes downwardly and inwardly from the front and the back. In this particular case, the bottom of the trough is on an arc struck from the center 72 which disposes the mouth of the trough further forward on the base than if concentric with the drum. By reason of this construction the attendant may easily remove the chips from the trough at the front while the machine is in operation.

The operation is as follows: It is assumed that the drum may be equipped for carrying cylinder motor blocks or any castings or forgings circumferentially spaced. The drum and spindles will be continuously revolved at the proper speeds so that the work is fed past the cutters at a suitable speed, such for example as a feed of about twelve inches per minute. The rate of feed is of course dependent upon the work to be performed. One or more operators as the case may require, stand at the rear of the machine and load the work-pieces whether in the form of castings, forgings or otherwise, onto the fixture. The work-pieces will be carried in succession between the roughing cutters 63 and the finishing cutters 64. It will be observed that the roughing cutters of each pair revolve in opposite directions and jointly mill each work-piece. The purpose of this arrangement is to lessen the strain of the heavy milling operation on the work-piece by reason of the opposing thrust of the cutters. This is especially desirable when working on thin wall castings, and distortion of the castings is reduced to a minimum. As the finished work-pieces are carried upwardly from beneath the drum the operators remove them and they are replaced by unfinished work-pieces. It will be observed that the cutters are positions out of the way of the loading station and so as to be accessible from the side of the machine opposite from said loading station. Consequently, the inspectors, maintenance or tool men may watch the tools and the driving mechanism at this side of the machine without interference with the loading operators, this being particularly desirable when machines of this kind are arranged in a battery.

It is believed that the foregoing conveys a clear understanding of the objects prefaced above, and while I have illustrated a single working embodiment it should be understood that considerable change might be made in the construction and arrangement of parts without departing from the spirit and scope of the invention as expressed in the appended claims, in which:

I claim:

1. A drum type continuous milling machine comprising, in combination, a rigid frame structure including laterally spaced upright housings, vertically spaced spindles journaled in bearings within each housing disposed adjacent to the front thereof and adapted to carry roughing and finishing surface milling tools, a rotary work-carrying drum interposed between and mounted on the housings on an axis intermediate the spindles and adjacent to the rear of the machine, and mechanism for continuously rotating the spindles and drum.

2. A milling machine as set forth in claim 1, in which the spindles in each housing are driven by a vertical shaft through the agency of a worm gear on each spindle and a driving worm on the shaft.

3. In a drum type continuous milling machine, in combination, a rigid frame structure including laterally spaced upright housings, vertically spaced spindles for each housing adapted to carry roughing and finishing surface milling tools, a rotary work-carrying drum interposed between and mounted on the housings with its axis of rotation intermediate the upper and lower spindles, each housing being shaped to provide a front bearing wall for the reception of the spindles and a rear bearing wall for the reception of the drum, and mechanism for continuously rotating the drum and spindles.

4. In a drum type continuous milling machine, in combination, a rigid frame structure including laterally spaced upright housings, vertically spaced spindles for each housing adapted to carry roughing and finishing surface milling tools between the housings, a rotary work-carrying drum interposed between and mounted on the housings with its axis of rotation intermediate the upper and lower spindles, the front wall of each housing being shaped to provide bearing supports for the spindles, and mechanism for continuously rotating the drum and spindles.

5. A drum type continuous milling machine, comprising, in combination, a rigid frame structure including laterally spaced upright hollow column housings, tool spindles journaled in bearings supported interiorly in each housing in vertically spaced relation adjacent to the front of the machine and adapted for carrying roughing and finishing surface milling tools intermediate the housings, and a rotary work-carrying drum interposed between and mounted on the housings on an axis located intermediate the upper and lower spindles.

6. A drum type continuous milling machine, comprising, in combination, a rigid frame structure including laterally spaced upright housings, a rotary work-carrying drum interposed between and supported on the housings, vertically spaced spindles for each housing adapted for carrying roughing and finishing surface milling tools, a bearing mounting for each spindle built into the housing, and mechanism for continuously rotating the drum and spindles, the direct means for rotating each spindle comprising a worm gear concentric and in driving connection with the spindle and located intermediate the ends thereof within the housing, and a driving worm meshing with the worm gear.

7. A drum type continuous milling machine comprising, in combination, a rigid frame structure including laterally spaced upright housings, a rotary work-carrying drum interposed between and mounted on the housings, vertically spaced spindles mounted on one of said housings and adapted for carrying roughing and finishing surface milling tools for surfacing work-pieces carried in succession by the rotating drum, a worm gear concentric and in driving connection with each spindle intermediate its ends, and mechanism for continuously rotating the drum and spindles including a driving train for the spindles on each housing having a vertical shaft equipped with worms in mesh with the spindle worm gears.

8. A drum type continuous milling machine comprising, in combination, a rigid frame structure including laterally spaced upright housings each defined by side walls joined by a front and a rear wall, rotary work-carrying drum mounted upon and between the housings, a pair of spindles mounted in each housing between the drum and front wall, one above and the other below the horizontal axis of the drum and adapted for carrying roughing and finishing surface milling tools, and mechanism for continuously rotating the spindles and drum including a vertical shaft journaled in each housing between the front wall and the drum and having a gearing connection with its respective cutter spindles, said gearing connection comprising worm gear concentric with each spindle and located between the side walls of the housing, and the vertical drive shaft being equipped with worms directly in mesh with said worm gears.

9. A drum type continuous milling machine comprising, in combination, a rigid frame structure including laterally spaced upright housings, a roughing and a finishing surface milling tool spindle journaled in bearings interiorly supported in one of the housings in vertically spaced relation adjacent to the front of the machine, a work drum interposed between and mounted on the housings, driving mechanism on the top of the frame connected to continuously rotate the drum and spindles, said driving mechanism including a prime mover, a horizontal shaft extending between the housings and driven from said prime mover, a vertical shaft extending down through each housing and geared at its upper end to said horizontal shaft and connected by worm and worm gears at spaced lower points to the spindles.

10. A drum type continuous milling machine comprising, in combination, a rigid frame structure including laterally spaced upright hollow column housings, a rotary work-carrying drum interposed between and supported on said housings, surface milling tool spindles journaled on each housing above and below the axis of rotation of the work drum for surfacing work-pieces carried in succession between them by rotation of the drum, and mechanism for continuously rotating the drum and spindles including a vertical shaft encased in each housing and connected by gearing therein to the upper and lower spindles, each vertical shaft being located in front of the spindles, and the front of each housing being removable substantially from top to bottom for access to said gearing and vertical shaft.

11. In a drum continuous milling machine, the combination of a rigid frame structure including laterally spaced upright housings, a rotary work-carrying drum interposed between and supported on the housings, and a plurality of surface milling tool spindles mounted on one of the housings for rough milling and finish milling a work-piece carried by the drum, including a pair of oppositely revolving tool spindles for simultaneously rough milling a work-piece.

12. In a drum continuous milling machine, the combination of a rigid frame structure including laterally spaced upright housings, a rotary work-carrying drum interposed between and supported on the housings, a plurality of surface milling tool spindles grouped together on one of the housings, and mechanism for continuously rotating the drum and spindles including gearing connecting the spindles and rotating them in opposite directions to simultaneously surface mill a work-piece by their joint action.

13. A drum type milling machine comprising, in combination, a rigid frame structure including laterally spaced upright housings, a rotary work-carrying drum supported upon and between the housing, a pair of surface milling tool spindles grouped together on one of the housings and adapted for a simultaneously rough milling a work-piece, a surface milling tool spindle mounted on said housing and adapted for finish milling the work-piece, and mechanism for continuously rotating the work-drum and spindles including means for rotating the rough milling spindles in opposite directions, whereby the work-pieces will be milled in succession, first by the simultaneous action of the rough milling tools and subsequently by the action of the finished milling tool.

14. In a drum type milling machine, in combination, laterally spaced upright housings and an interposed rotary work-carrying drum supported on said housings, one of the housings being shaped to provide adjacent to its inner side a cylindrical bearing parallel with the axis of rotation of the work drum, a surface milling tool spindle, a sleeve in which the spindle is journaled and which in turn is mounted to slide lengthwise in said housing bearing, a spindle-driving gear splined on the spindle and held against axial displacement in one direction by the housing, and an end plate removably secured to the housing for holding said gear against axial displacement in the opposite direction.

15. In a drum type milling machine, in combination, laterally spaced upright housings and an interposed rotary work-carrying drum supported on said housings, a surface milling tool spindle, a sleeve in which the spindle is journaled, a bearing on one of the housings for supporting the spindle-bearing sleeve with its axis parallel with the axis of rotation of the drum, a spindle-driving gear concentric with the spindle, and a supporting bearing for the spindle-driving gear removably secured to said housing at the outer side thereof.

16. In a drum type milling machine, in combination, laterally spaced upright housings, and a rotary work-carrying drum interposed between and supported on said housings, a surface milling tool spindle assembly mounted on one of the housings comprising a spindle and a bearing sleeve therefor, a spindle-driving gear and a supporting bearing therefor removably mounted on the housing with the gear in driving relation with the spindle, and means for driving said gear.

17. In a drum type milling machine, in combination, laterally spaced upright housings and a rotary work-carrying drum interposed between and supported on said housings, a surface milling tool spindle, a quill in which the spindle revolves, a quill-bearing in the housing at the inner side thereof for supporting the tool-carrying end of the spindle, a spindle-driving gear concentric with the spindle beyond the outer end of the quill, and a bearing for the spindle-driving gear carried by an end plate removably secured to the housing.

18. In a drum type milling machine the combination of a frame structure including laterally spaced upright housings, a rotary work-carrying drum supported by and between the housings, a surface milling tool spindle assembly for one of said housings, comprising a spindle and a sleeve bearing therefor constituting a unit adapted to be positioned in the housing by endwise movement, a worm gear and a bearing therefor constituting a unit adapted to be positioned in operative connection with the spindle from the outer side of the housing, and means for driving said worm gear.

19. In a drum type milling machine, in combination, a frame structure including laterally spaced upright housings, a rotary work-carrying drum interposed between and supported on the housings, a surface milling tool spindle mounted on each housing for milling work-pieces carried between them by the rotating drum, the mounting for each spindle comprising a quill in which the spindle is journaled, a cylindrical bearing on the housing at the inner side thereof, in which bearing the quill is mounted, an end plate removably mounted on the outer wall of the housing and providing bearing support for the outer end of the spindle, and a spindle driving gear intermediate said quill bearing and said end plate.

20. In a milling machine, in combination, a frame structure including an upright housing, a surface milling tool spindle mounted on said housing, the mounting for said spindle comprising a quill in which the spindle is journaled, a bearing mounting for the quill built into the housing wall, an end plate bolted to the opposite wall of the housing and providing bearing support for the opposite end of the spindle, and a spindle intermediate said quill bearing and end plate.

21. In a drum type milling machine, in combination, a frame structure including laterally spaced upright housings, a rotary work-carrying drum interposed between and supported on the housings, a surface milling tool spindle mounted on each housing for milling work-pieces carried between them by the rotating drum, the mounting for each spindle comprising a quill in which the spindle is journaled, a bearing support for the quill built into the front wall of the housing at the inner side thereof, a spindle driving gear concentric with the spindle and held from endwise displacement inwardly by the housing, and a removable end plate providing bearing support for the outer end of the spindle and holding the spindle driving gear from endwise displacement outwardly.

22. In a drum type milling machine, in combination, a frame structure including laterally spaced upright housings, a rotary work-carrying drum interposed between and supported on the housings, a surface milling tool spindle mounted on each housing for milling work-pieces carried between them by the rotating drum, the mounting for each spindle comprising a quill in which the spindle is journaled, a bearing mounting for the quill built into the housing at the inner side thereof, an end plate removably mounted on the outer wall of the housing providing bearing support for the outer end of the spindle, and a spindle driving gear concentric with the spindle located between said quill mounting and said end plate.

23. A drum type continuous milling machine comprising, in combination, a rigid frame structure including laterally spaced upright housings, vertically spaced roughing and finishing surface milling tool spindles journaled in bearings, the mountings for which are built into each housing adjacent to the front thereof, a rotary work-carrying drum interposed between and supported on the housings on an axis intermediate the spindles, and mechanism for continuously rotating the spindles and drum including a drive shaft extending between the housings at the upper end thereof connected by gears to a vertical shaft extending down through each housing and connected by gearing therein to the spindles, and a gear of relatively large diameter on the drum driven by a pinion mounted at the upper end of the frame structure and in turn driven by said drive shaft.

24. A drum type continuous milling machine comprising, in combination, a rigid frame structure including laterally spaced upright hollow column housings, a rotary work-carrying drum interposed between the housings, a roughing and a finishing surface milling tool spindle mounted on each housing for surfacing work-pieces carried in succession between them by the drum, the mountings for both ends of the drum and for the spindles being built into the walls of the housings, and drive mechanism for continuously rotating the drum and spindles including a prime mover mounted on the top portion of the frame structure, a horizontal shaft on said top portion of the frame structure driven by said prime mover, a spindle driving train extending down through each housing and geared at its upper end to said horizontal shaft and at lower points to the spindles, said drive mechanism including a gear of relatively large diameter fixed to the drum and reaching to said top portion of the frame structure, and a drum driving pinion mounted on said top portion of the frame structure in mesh with the drum gear.

25. A drum type continuous milling machine comprising, in combination, a rigid frame structure including laterally spaced housings, a rotary work-carrying drum interposed between and mounted on the housings, vertically spaced spindles mounted on each housing adapted to carry roughing and finishing surface milling tools for surfacing work-pieces carried in succession between them by the rotating drum, and mechanism for continuously rotating the drum and spindles including a horizontal drive shaft extending between the housings, a vertical shaft in each housing geared at one end to the horizontal drive shaft and equipped with spindle drive worms, and a worm gear concentric and in driving connection with a roughing and a finishing tool spindle on each housing and in mesh with a spindle drive worm.

26. A drum type continuous milling machine comprising, in combination, a rigid frame structure including laterally spaced upright hollow column housings, vertically spaced roughing and finishing surface milling tool spindles, the bearing supports for which are built into the housings, a rotary work-carrying drum interposed between and supported on the housings with its axis of rotation intermediate the upper and lower spindles and adapted to carrying work-pieces in succession between the roughing and finishing tools, a gear of relatively large diameter on the drum for rotating it, and driving mechanism on the frame structure including a prime mover connected by driving trains to continuously rotate the drum and spindles, the spindle driving trains being encased in each housing and including a vertical shaft connected by gearing to the spindles.

27. A drum type continuous milling machine comprising, in combination, a rigid frame structure including laterally spaced upright housings, vertically spaced spindles journaled in bearings in each housing disposed adjacent to the front thereof and adapted to carry roughing and finishing surfacing tools, a rotary work-carrying drum interposed between and supported on the housings on an axis intermediate the spindles, and mechanism for continuously rotating the spindles and drum comprising a prime mover on the top portion of the frame structure, a horizontal shaft driven by said prime mover, a vertical shaft for each housing geared at its uper end to said horizontal shaft and at lower points to the spindles, and a gear of relatively large diameter on the drum driven by a pinion mounted on the upper portion of the frame structure and in turn driven from said horizontal shaft.

28. A drum type continuous milling machine comprising, in combination, a frame structure including laterally spaced upright housings joined together at the top and bottom, a rotary work-carrying drum interposed between and supported on the housings, vertically spaced surface milling tool spindles mounted on each housing, a horizontal drive shaft on the top portion of the frame structure, a vertical shaft in each housing geared at its uper end to said horizontal drive shaft and extending down through the housing and geared therein to the spindles, a gear of relatively large diameter fixed to the drum, and a driving pinion for said drum gear driven by said horizontal drive shaft.

29. A milling machine as set forth in claim 28, in which the connection between the drum gear pinion and the horizontal shaft includes change-speed gearing for changing the rate of travel of the drum with respect to the rotation of the spindles.

30. A drum type continuous milling machine comprising, in combination, a rigid frame structure including laterally spaced upright housings, each having a perpendicular front and a forwardly and upwardly inclined rear wall, vertically spaced roughing and finishing surface milling spindles for each housing adjacent to its front, the bearing mountings for which spindles are built into the housing, a rotary work-carrying drum interposed between and journaled at its ends on the housings, the bearing mountings for the drum journals being built into the rear walls of the housings and said mountings including removable bearing caps whereby the drum is removable at the rear of the machine, and mechanism mounted on the narrow top portion of the frame structure and connected to continuously rotate the drum and spindles, including a vertical shaft extending down through each housing and connected to each spindle through the agency of gearing within the housing.

JOHN R. JOHNSON.